US007315735B2

(12) United States Patent
Graham

(10) Patent No.: US 7,315,735 B2
(45) Date of Patent: Jan. 1, 2008

(54) SYSTEM AND METHOD FOR EMERGENCY 911 LOCATION DETECTION

(75) Inventor: Gerald Graham, Kleinburg (CA)

(73) Assignee: P.G. Electronics Ltd., Weston, Ontario (CA)

( * ) Notice: Subject to any disclaimer, the term of this patent is extended or adjusted under 35 U.S.C. 154(b) by 139 days.

(21) Appl. No.: 10/785,878

(22) Filed: Feb. 24, 2004

(65) Prior Publication Data

US 2005/0186937 A1    Aug. 25, 2005

(51) Int. Cl.
*H04M 11/04* (2006.01)
(52) U.S. Cl. ............... 455/404.1; 455/404; 455/404.2; 379/37; 370/95
(58) Field of Classification Search ............ 455/404.1, 455/456.2, 404.2, 521; 340/573.1, 539.13; 342/357.1, 387; 379/45, 49, 37; 348/143; 370/95
See application file for complete search history.

(56) References Cited

U.S. PATENT DOCUMENTS

| | | | | |
|---|---|---|---|---|
| 4,839,892 A | * | 6/1989 | Sasaki | 370/348 |
| 5,864,755 A | * | 1/1999 | King et al. | 455/404.1 |
| 5,873,040 A | * | 2/1999 | Dunn et al. | 455/456.2 |
| 6,032,035 A | * | 2/2000 | Webster et al. | 455/404.2 |
| 6,266,013 B1 | * | 7/2001 | Stilp et al. | 342/387 |
| 6,281,837 B1 | * | 8/2001 | Richton et al. | 342/357.1 |
| 6,421,009 B2 | | 7/2002 | Suprunov | |
| 6,603,977 B1 | | 8/2003 | Walsh et al. | |
| 2002/0057340 A1 | * | 5/2002 | Fernandez et al. | 348/143 |
| 2002/0118796 A1 | * | 8/2002 | Menard et al. | 379/45 |
| 2002/0186135 A1 | * | 12/2002 | Wagner | 340/573.1 |
| 2003/0151506 A1 | * | 8/2003 | Luccketti | 340/539.13 |
| 2004/0100377 A1 | * | 5/2004 | Brackett et al. | 340/539.13 |
| 2004/0203569 A1 | * | 10/2004 | Jijina et al. | 455/404.1 |
| 2004/0239498 A1 | * | 12/2004 | Miller | 340/539.13 |

* cited by examiner

*Primary Examiner*—Joseph Feild
*Assistant Examiner*—Michael Vu
(74) *Attorney, Agent, or Firm*—Young Basile, P.C.

(57) ABSTRACT

A location detection system for locating a mobile device placing an emergency 911 call within a facility having a distributed antenna system. The location detection system includes one or more detection units located within the distributed antenna system and being associated with one or more antennas. Each detection unit monitors a dedicated emergency 911 channel for activity and alerts a monitor unit if activity is detected. The monitor unit determines the location of the antenna receiving the emergency 911 call based upon the identity of the detection unit.

14 Claims, 2 Drawing Sheets

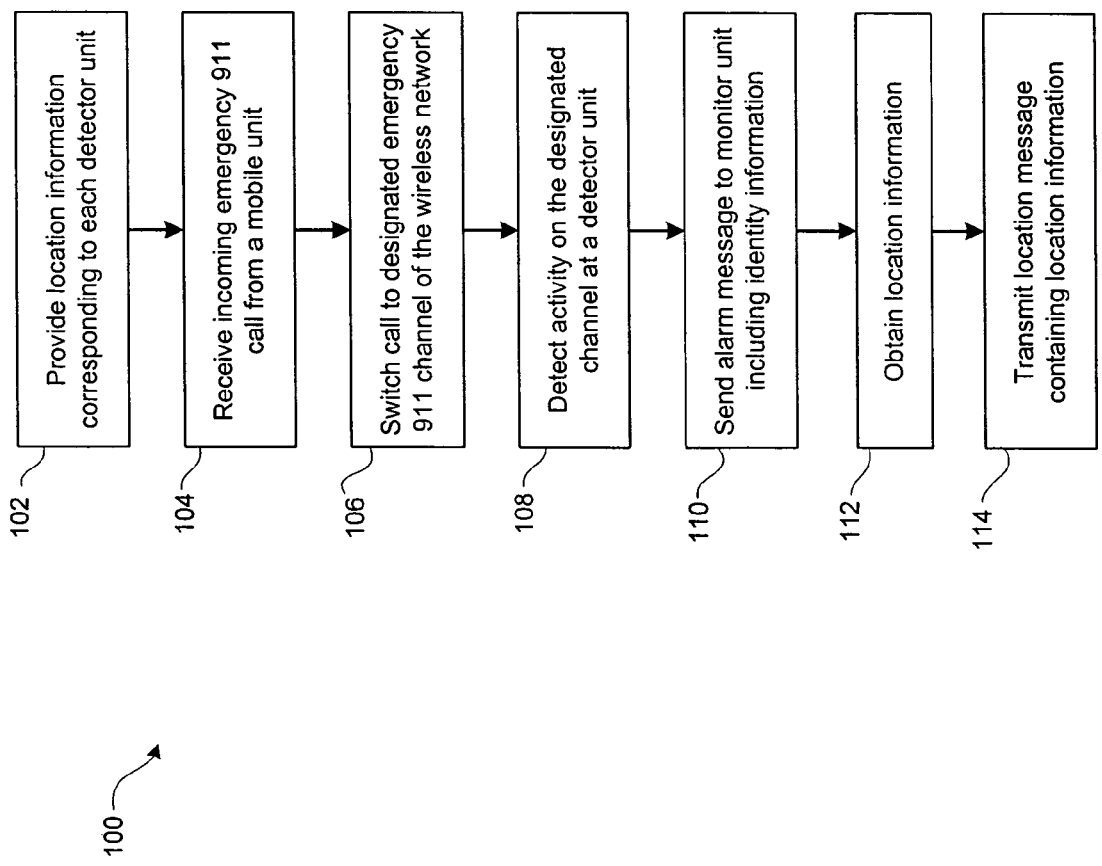

SYSTEM AND METHOD FOR EMERGENCY 911 LOCATION DETECTION

FIELD OF THE INVENTION

The present invention relates to emergency 911 location detection and, in particular, a system and method for determining the location of a wireless device that has initiated an emergency 911 call.

BACKGROUND OF THE INVENTION

Wireless communication systems present particular difficulties for servicing emergency 911 calls. With the conventional public switched telephone network and land-line services, the location of terminal equipment is fixed and can be pinpointed rather easily. The terminal equipment has a telephone number that is associated with a fixed location. Because a wireless communication system is designed to provide communications service to mobile devices, the location of the devices at any one time is difficult to determine.

A number of techniques have been developed to accurately locate a mobile device that has placed an emergency 911 call. For example, some systems employ triangulation methods to locate the device by comparing signal strength, time-of-arrival, and/or angle-of-arrival information from multiple antennas. Other systems employ global positioning devices within the handset to locate the mobile device.

One difficulty that arises for known solutions is operation within certain facilities. Many facilities present problems for wireless signals and require that an in-facility signal distribution system be employed to provide adequate wireless reception and coverage within the facility. Signal distribution is often accomplished by providing an antenna distribution system that is coupled to a base station of the wireless communications system. In large facilities, this can mean that the only information that the wireless communications system will have regarding a call is that it originates within the facility. Angle-of-arrival or signal strength techniques of locating the mobile device are ineffective within such a facility.

Accordingly a need exists for more accurately locating a mobile device originating an emergency 911 call from within a facility that employs a distributed antenna system.

SUMMARY OF THE INVENTION

The present invention provides a method and system that locates a mobile device originating an emergency 911 call from within a facility. A dedicated 911 channel is monitored for activity over the in-facility distributed antenna system. When activity is detected, then the location of the antenna(s) on which activity is detected corresponds to the location of the mobile device.

In one aspect, the present invention provides a method of location detection in a wireless communication system having a designated emergency wireless channel and having a distributed antenna system, the distributed antenna system having multiple antennas and a detection unit, the detection unit being associated with at least one of the antennas and having stored therein unique identifying information. The method includes the steps of detecting an emergency call from a mobile device by detecting activity on the designated emergency wireless channel at the detection unit, and sending an alarm signal to a monitor unit when the emergency call is detected, the alarm signal including the unique identifying information, whereby, using the unique identifying information, the monitor unit determines a location of the mobile device based upon a location of the one of the antennas.

In another aspect the present invention provides a location detection system for determining the location of a mobile device placing an emergency 911 call from within an in-facility distributed antenna system for a wireless communication system, the wireless communication system having a designated emergency wireless channel, the in-facility distributed antenna system having multiple antennas. The system includes a detection unit coupled to the in-facility distributed antenna system and associated with at least one of the antennas, the detection unit having stored therein unique identifying information, the detection unit detecting the emergency 911 call from the mobile device by detecting activity on the designated emergency wireless channel at the one of the antennas, and the detection unit sending an alarm signal when the emergency call is detected, the alarm signal including the unique identifying information; and a monitor unit coupled to the in-facility distribution system for receiving the alarm signal, the monitor unit using the unique identifying information to determine a location of the mobile device based upon a location of the one of the antennas.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which:

FIG. 2 shows in flowchart form a method of location detection for mobile device-initiated emergency 911 calls.

Similar reference numerals are used in different figures to denote similar components.

DESCRIPTION OF SPECIFIC EMBODIMENTS

Figure 1:
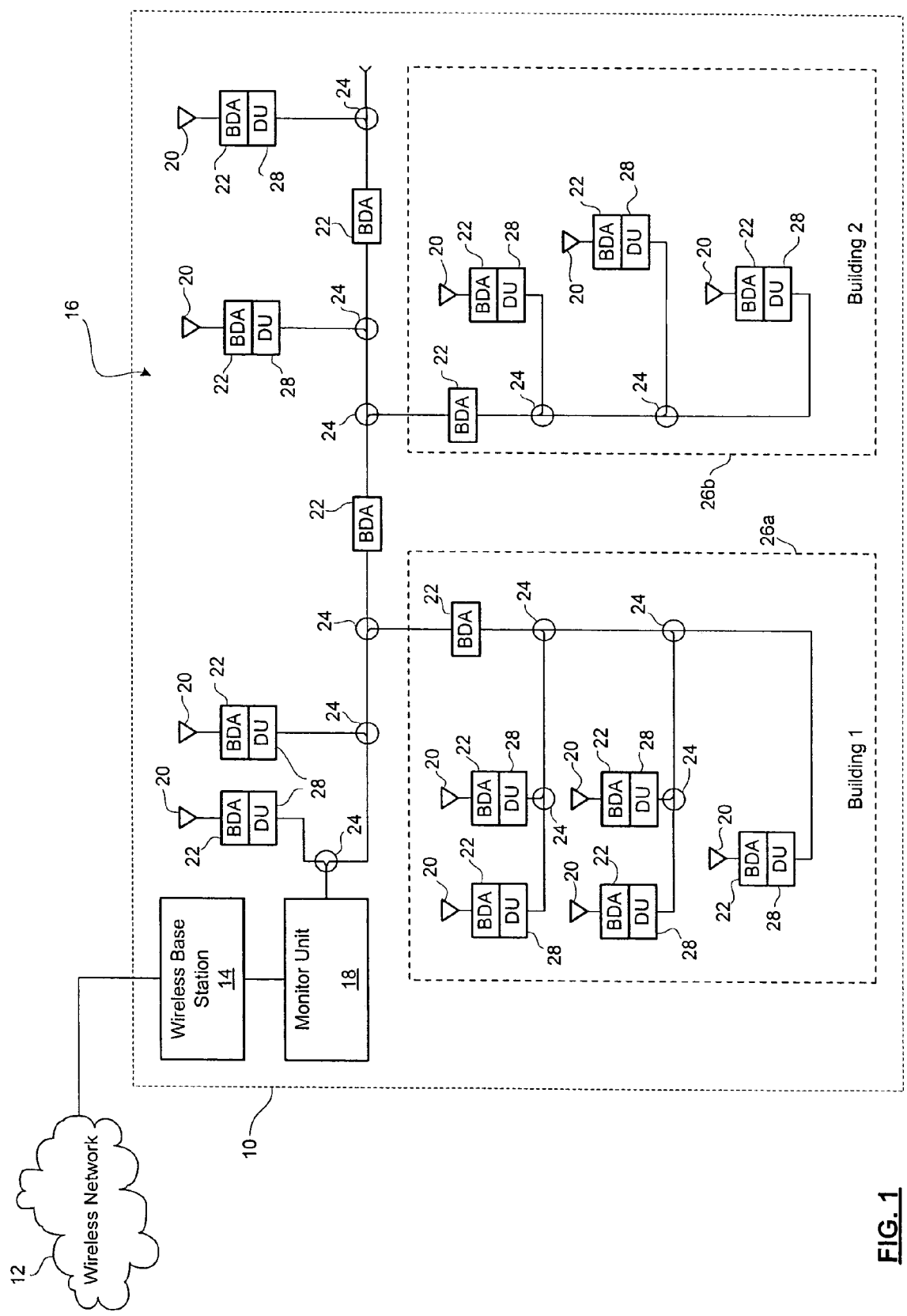
FIG. 1 shows a block diagram of a system for location detection in accordance with the present invention.

The following description of one or more specific embodiments of the invention does not limit the implementation of the invention to any particular computer programming language or system architecture. The present invention is not limited to any particular operating system, mobile device architecture, or computer programming language.

Reference is first made to FIG. 1, which shows a block diagram of a system for location detection in accordance with the present invention. A facility 10 has a wireless base station 14, which is coupled to a wireless network 12. The wireless network 12 may be a cellular network, a PCS network, a paging network, or other wireless communication network for interfacing with mobile devices. The wireless network 12 may operate using AMPS, DAMPS, NADC, CDMA, TDMA, GSM, or other modulation protocols.

The facility 10 may be an indoor facility, an outdoor facility or a mixture of enclosed and open-air spaces. Without limiting the generality of the foregoing, the facility 10 may, for example, be a shopping centre, an underground concourse, a subway system, a stadium, a hotel, an office tower, an entertainment center, or a business or industrial complex. In the embodiment shown in FIG. 1, the facility 10 includes an exterior area, a first building 26a and a second building 26b.

A distributed antenna system, generally denoted by the reference numeral 16, is provided within the facility 10. The distributed antenna system 16 is coupled to the wireless base station 14 so as to provide adequate wireless coverage for the wireless network 12 throughout the facility 10. The distributed antenna system 16 includes a plurality of antennas 20 positioned in a variety of locations throughout the facility 10, including within the two buildings 26a, 26b. The antennas 20 are coupled to the wireless base station 14 by coaxial cable, fibre optic cable, twisted pair wiring or any other signal medium, whether wired or wireless. The distributed antenna system 16 may be deployed in a tree-and-branch architecture using coupler units 24 to split signals between branches. It will be understood that the distributed antenna system 16 may be deployed using other architectures.

The distributed antenna system 16 may include a number of bi-directional amplifiers 22 to compensate for cable losses at various points in the distributed antenna system 16.

The distributed antenna system 16 provides a number of channels for receiving and transmitting communications between the wireless network 12 and mobile devices (not shown) operating within the facility 10.

The distributed antenna system 16 includes a monitor unit 18 for detecting faults and receiving information signals from the bidirectional amplifiers 22 on the distributed antenna system 16 and generating alarms, reports or other outputs. The monitor unit 18 may monitor the performance of the bidirectional amplifiers 22, including any changes in power output. The monitor unit 18 may generate alarm signals for display on an in-building monitoring station or computer. The alarm signals may also be transmitted through modem connection, Ethernet connection, or other network connection to an external system.

In one embodiment, the distributed antenna system 16 is a coaxial-based system and the bidirectional amplifiers 22 boost signals in the uplink and downlink cellular bands. The system 16 uses low frequency signals to communicate status information from the bidirectional amplifiers 22 to the monitor unit 18 and to communicate commands from the monitor unit 18 to the bi-directional amplifiers 22. However, it will be understood that the present invention is not limited to any particular distributed antenna system 16 and may include other systems, including those which carry RF and status signals, in digital or analog format, at other frequencies and over other media between the antennas 20, the bidirectional amplifiers 22 (if any), and the monitor unit 18.

In accordance with the present invention, the distributed antenna system 16 includes detection units 28 associated with the antennas 20. In a preferred embodiment, one detection unit 28 is associated with each antenna 20; however, more detection units 28 or fewer detection units 28 may be provided within the distributed antenna system 16. As will be better understood from the description below, the placement or configuration of detection units 28 will depend on the precision with which the location of mobile devices needs to be determined within the distributed antenna system 16. For example, in one embodiment it may only be necessary to identify whether a mobile device is within the first building 26a or the second building 26b. In such an embodiment, it may only be necessary to have one detection unit 28 upstream of the portion of the distributed antenna system 16 within each building 26. For instance, each building 26 could have a detection unit 28 associated with the point at which the distributed antenna system 16 enters the building 26. In another embodiment, it may be necessary to pin-point the location of a mobile device within the two buildings 26a, 26b, in which case detection units 28 may be provided for each antenna 20 of the distributed antenna system 16.

The wireless network 12 designates one channel as an emergency 911 channel. This channel may be reserved for emergency 911 calls by mobile devices. When an emergency 911 call is received by the wireless network 12 it recognizes that it is an emergency call, switches it to the designated channel, and routes it to a public safety answering point (PSAP). At the PSAP, the call is received and dealt with by an emergency 911 operator.

The detection units 28 monitor the designated emergency 911 channel for activity. In this manner, a detection unit 28 can determine if an emergency 911 call has been received by an antenna 20 with which it is associated.

If a detection unit 28 detects activity on the designated emergency 911 channel, then it sends a message to the monitor unit 18. This message includes identification information corresponding to the detection unit 28 which allows the monitor unit 18 to determine from which detection unit 28 the message was received. The identification information may include a detection unit identification code or serial number which the monitor unit 18 may use to identify the detection unit 28. The identification information may also include specific location information corresponding to the location in which the detection unit 28 and its associated antenna 20 are deployed. If the identification information does not contain location specifics, then the monitor unit 18 may have a lookup table of stored location information that may be cross-referenced against the identification information. Accordingly, based upon the detection unit serial number or other identifying information, the monitor unit 18 may determine where the detection unit 28 and/or its corresponding antenna 20 are located. This information assists in pin-pointing the area within the facility 10 from which the emergency 911 call originated.

When the monitor unit 18 receives a message from a detection unit 28 indicating that the detection unit 28 has identified an emergency 911 call, the monitor unit 18 outputs an alarm signal. The alarm signal may be a message to a central facility monitoring station, such as a security console or station. The alarm signal may be an external message to a security firm, to emergency services, to the PSAP, or to others. The external message may be sent via e-mail, phone, dedicated data link, or through other mediums using other protocols. Whether internal or external, the message includes information regarding the location of the detection unit 28 or associated antenna 20 corresponding to the detected emergency 911 call. The monitor unit 18 may use the wireless network 12 to transmit its message to its intended recipient, such as the PSAP, however it need not use the wireless network 12 and may use other mediums, such as the public switched telephone network (PSTN) or a dedicated data link.

If provided to the PSAP, the message may also incorporate an identifier to associate it with the actual audio emergency 911 call received at the PSAP from the mobile device through the wireless network 12. The PSAP may then direct appropriate emergency services to a more precise location of the facility 10 where the mobile device is located.

The detection unit 28 may be incorporated into the bi-directional amplifiers 22, or they may be deployed separately or incorporated into other equipment on the system.

In one embodiment, the detection unit 28 comprises a base chip normally utilized in a cellular phone. The base chip provides for switching to a particular cell phone voice channel, and provides for measurement of the signal strength received on that channel, i.e. a Received Signal Strength Indicator (RSSI). Such a base chip is set to monitor the designated emergency 911 channel and provide an indicator or alarm when the signal strength on the designated emergency 911 channel exceeds a predetermined level. The detection unit 28 may incorporate separate base chips for each modulation, such as GSM, CDMA, TDMA, or iDEN. Different operators may allocate different designated emergency 911 channels, in which case the detector unit 28 may incorporate multiple base chips or a signal base chip designed to monitor the multiple channels. In another embodiment, the detection unit 28 is based upon a custom designed chip for monitoring one or more designated emergency 911 channels using one or more modulation schemes.

Reference is now made to FIG. 2, which shows in flowchart form a method 100 of location detection for mobile device-initiated emergency 911 calls. The method begins in step 102 by providing location information corresponding to each detection unit 28 (FIG. 1) within the distributed antenna system 16 (FIG. 1) in the facility 10 (FIG. 1). The unit-specific location information may be programmed into each detection unit 28 once the distributed antenna system 16 has been deployed. For example, each detection unit 28 may be assigned an alphanumeric identifier indicative of its location or the location of its associated antenna 20 (FIG. 1). For instance, example identifiers may read "Building A, Floor 3", "Stadium West Concourse", or "St. Andrew Subway Station". Other codes or descriptions may be used.

Instead of programming location information into each detection unit 28 after the detection units 28 have been deployed into specific areas of the facility 10, the detection units 28 may be programmed with an identifier and the monitor unit 18 (FIG. 1) may have access to a look-up table that has been programmed with the location information corresponding to particular detection unit identifiers. For example, a detection unit 28 may be pre-programmed with a serial number or other unique identifier and the monitor unit 18 may have a look-up table with an entry for that serial number which indicates the detection unit 28 corresponds to "Building A, Floor 3". In this case, step 102 of the method 100 includes providing the monitor unit 18 with the location information in a look-up table or in another format stored in memory.

With the location information provided and the distributed antenna system 16 deployed and operating within the facility 10, the method 100 awaits detection of an emergency 911 call. In step 104, a mobile device within the facility 10 places an emergency 911 call. The distributed antenna system 16 manages this call as a regular call, routing the call through the wireless base station 14 to the wireless network 12. The wireless network 12 receives the call—or call request—and recognizes that the call is an emergency 911 call based upon the digits dialed by the mobile device user. In step 106, the wireless network 12 switches the call to the designated emergency 911 channel. This may include transmitting a code or other instruction to the wireless base station 14 causing the wireless base station 14 to switch the call to a designated emergency 911 channel within the distributed antenna system 16.

In step 108, one or more of the detection units 28 detect activity on the designated emergency 911 channel. More than one detection unit 28 may detect activity if the detection units 28 are deployed in a tree-and-branch architecture—that is, some detection units 28 are placed upstream of a wide area of the distributed antenna system 16 and other detection units 28 are more focused on particular areas within the wider areas.

Once a detection unit 28 has detected activity on the designated emergency 911 channel, the detection unit 28 sends an alarm message to the monitor unit 18 in step 110. The alarm message includes a unique detection unit identifier. As discussed above, the unique identifier may include a serial number or other unique code, and may include assigned alphanumeric location information.

At the monitor unit 18, in step 112 the location information corresponding to the detected emergency 911 call is obtained. If the detection unit 28 that detected the call has transmitted an alphanumeric location descriptor, such as "Building A, Floor 3", then the monitor unit 18 may obtain the location information directly from the alarm message received from the detection unit 28. If the alarm message does not contain this location information, then the monitor unit 18 may look up the location information a look-up table, or other data structure, based upon the unique detection unit identifier.

In step 114, the monitor unit 18 sends a location message containing the location information obtained in step 112. As discussed above, the location message may be an internal message to security or administrative staff at the facility 10. The location message may also be an external message to a third party, such as emergency services, the PSAP, or other possible recipients. It may be transmitted in any number of ways, including by dedicated data link, dial-up connection, wireless transmission, and others.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of location detection in a wireless communication system, the wireless communication system being connected to a cellular wireless network for distributing cellular communications with a facility, the cellular wireless network having a plurality of channels including a designated emergency wireless channel reserved for emergency calls, the wireless communications system having a distributed antenna system including multiple antennas and a detection unit, the detection unit being associated with at least one of the antennas and having stored therein unique identifying information, the method comprising the steps of:
    detecting an emergency call from a mobile device by detecting activity on the designated emergency wireless channel at the detection unit;
    sending an alarm signal to a monitor unit within the wireless communication system when the emergency call is detected, said alarm signal including the unique identifying information,
whereby, using the unique identifying information, said monitor unit determines a location of said mobile device based upon a location of the one of the antennas.

2. The method claimed in claim 1, wherein said unique identifying information includes a location descriptor.

3. The method claimed in claim 1, wherein said monitor unit includes a look-up table having location descriptors, and wherein said method further includes a step of selecting a location descriptor from said look-up table based upon said unique identifying information.

4. The method claimed in claim 1, further including a step of sending an alarm message from said monitor unit to a remote location.

5. The method claimed in claim 4, wherein said remote location includes a location selected from the group comprising a public safety answering point, an emergency services provider, and facility security.

6. The method claimed in claim 4, further including a step of selecting a location descriptor corresponding to said location of one of the antennas, and wherein said alarm message includes said location descriptor.

7. The method claimed in claim 1, further including steps of receiving the emergency call from the mobile device at the cellular wireless network on one of the plurality of channels other than the designated emergency wireless channel and switching the emergency call to the designated emergency wireless channel.

8. A location detection system for determining the location of a mobile device placing an emergency 911 call from within an in-facility distributed antenna system for a wireless communication system, the wireless communication system being connected to a cellular wireless network for distributing cellular communications within the facility, the cellular wireless network having a plurality of channels including a designated emergency wireless channel reserved for emergency calls, the in-facility distributed antenna system having multiple antennas, the system comprising:

a detection unit coupled to the in-facility distributed antenna system and associated with at least one of the antennas, the detection unit having stored therein unique identifying information, wherein the detection unit is configured to detect the emergency 911 call from the mobile device by detecting activity on the designated emergency wireless channel at said one of the antennas, and the detection unit is configured to send an alarm signal when the emergency call is detected, said alarm signal including the unique identifying information; and a monitor unit coupled to the in-facility distribution system and configured for receiving said alarm signal, said monitor unit being configured to use said unique identifying information to determine a location of said mobile device based upon a location of the one of the antennas.

9. The location detection system claimed in claim 8, wherein said unique identifying information includes a location descriptor.

10. The location detection system claimed in claim 8, wherein said monitor unit includes a look-up table having location descriptors and a look-up component for selecting one of said location descriptors based upon said unique identifying information, said location of the one of the antennas comprising said selected location descriptor.

11. The location detection system claimed in claim 8, wherein said monitor unit includes a message component for transmitting a message to a remote location.

12. The location detection system claimed in claim 11, wherein said message includes a location descriptor.

13. The location detection system claimed in claim 11, wherein said remote location is selected from the group comprising a public safety answering point, an emergency services provider, and facility security.

14. The location detection system claimed in claim 8, wherein the wireless network is configured to received and detect the emergency 911 call from the mobile device on one of the plurality of channels other than the designed emergency wireless channel, and is configured to switch the emergency 911 call to the designed emergency wireless channel.

* * * * *